Patented Aug. 26, 1941

2,253,762

UNITED STATES PATENT OFFICE 2,253,762

CONTROL OF SLIME AND ALGAE

Thomas S. Carswell, Longmeadow, and Howard K. Nason, Springfield, Mass., assignors to Monsanto Chemical Company, St. Louis, Mo., a corporation of Delaware No Drawing. Application November 27, 1939, Serial No. 306,290

17 Claims. (Cl. 210—23)

The present invention relates to methods for the control of slime and algal growth in systems wherein circulating water is used for the cooling of water or for washing air, gases and for associated purposes, in power plants, air-conditioning systems, and similar installations. This application is a continuation-in-part of our application Serial No. 112,282, filed November 23, 1936.

Slime is generally considered to be a growth produced by algae, protozoa and diatoms, the algae being, for example, of such varied genera as Palmellococcus, Ulothrix, Spirogyra and Scenodesmus, etc. The composition of slime and the problem of slime and algae control has been described in a paper by one of the applicants in the Journal of the American Water Works Association, vol. 30, pages 437 to 452 (March, 1938). In power plants wherein the condenser cooling water is sprayed and recycled the formation of slime produces stoppage of spray nozzles and stoppages in other parts of the system. When condensers become covered with slime the efficiency of fluid transfer and heat transfer is reduced considerably. The desirability of an effective method for the control or reduction of slime formation in thus evident.

Agents which have heretofore been used for the control of slime and algae include such varied materials as chlorine, chloramine-T, chlorine-ammonia compounds, copper sulfate and oxidizing agents such as potassium permanganate. The relative merits of these agents have been summarized in the aforementioned publication by one of us.

The object of the present invention is to provide a simple and economical method for the control or prevention of slime and algal growth in water-spray systems by the use of algicides of pronounced activity and toxicity and which substances will not have any substantial corrosive action on copper, zinc, iron and similar metals of construction. The algicides used for this purpose must not only be non-corrosive to the materials with which the water spray comes in contact, but must also be highly toxic to algae and slime organisms, must be substantially odorless and non-volatile, and must be soluble in water and stable on prolonged aeration.

The invention is based on the discovery that water-soluble salts, particularly alkali-metal salts, of 2,4,5-trichlorophenol, 2,3,4,6-tetrachlorophenol, pentachlorophenol and similar halogenated monocyclic phenols having not less than three halogen atoms in the molecule, at least two halogen atoms of which are in adjacent positions on the benzene nucleus, as well as the free phenols themselves are remarkably active algicides. Phenols have heretofore not been recognized as algicidal materials. Furthermore, algicidal action appears to bear no definite predictable relation to bactericidal or fungicidal effectiveness of a particular material. This is evident from the table which follows. In this table are recorded the best available values obtained from the art and from our researches on the phenol coefficients of various materials, the relative fungicidal toxicity of the materials and the relative algicidal effectiveness of the materials toward a mixed culture of algae comprising the genera Chlorella, Scenodesmus, Palmellococcus, Oscillatoria, Spirogyra, Synura and Aphanizomenon and protozoa growing in Uspenski's medium (aqueous medium containing approximately 25 parts per million (ppm.) of potassium nitrate, 25 ppm. of magnesium sulfate, 100 ppm. of calcium nitrate, 25 ppm. of monopotassium phosphate, 34.5 ppm. of potassium carbonate and 1.25 ppm. of ferric sulfate). The phenol coefficients of the particular compounds are those observed at 20° C., unless another temperature is specified, against the organisms, Eberthella typhi and Staphylococcus aureus. The fungicidal toxicity is expressed as percentages of the material necessary to prevent growth of Fomes annosus (or Forest Products Laboratory culture No. 517) and Seretostomela pilifera (or Forest Products Laboratory culture No. 3) on agar medium. The algicidal effectivenesses are represented as parts per million (ppm.) required to prevent growth and to produce killing, respectively, of the mixed culture of algae. The highest concentration used was 50 ppm., hence it was not possible to place the poorer algicidal materials in any relative positions as concerns algicidal effectiveness but comparisons with the more effective algicidal materials can be made on the basis of the values given. In all but one instance (the phenol coefficients of 2,4,6-trichlorophenol) the phenols specified were used in the form of their sodium salts and the values given in the table are those for the respective sodium salts of the specified phenols.

two general classes of organisms. These results were obtained from tests on a suspension of slime containing algae, diatoms and protozoa, obtained

| Chemical (sodium salts of phenols) | Phenol coefficient (20° C.) | | Fungicidal toxicity | | Algicidal toxicity | |
|---|---|---|---|---|---|---|
| | E. typhi | S. aureus | F. annosus | C. pilifera | Prevent growth | Kill |
| | | | Percent | Percent | Parts per million | Parts per million |
| Copper sulfate | (1) | (1) | 0.10 | 0.40 | 5 | 10 |
| Zinc sulfate | (1) | (1) | 0.65 | | 30 | 50 |
| Mercuric chloride | 143 | 100 | 0.005 | | 5 | 15 |
| Silver nitrate | (2) | (2) | (T.I.P.)0.02 | | 50 | 50 |
| Ferrous sulfate | (1) | (1) | | | 5 | 10 |
| Formaldehyde | 0.3(37°) | 0.7(37°) | 0.0375 | 0.0375 | | |
| Chloramine-T | 100(37°) | 133(37°) | | | 100 | 100 |
| Phenol | 1.0 | 1.0 | 0.20 | 0.20 | >50 | >50 |
| o-Chlorophenol | 3.6 | 3.8 | 0.028 | 0.028 | >50 | >50 |
| m-Chlorophenol | 7.4 | 5.8 | 0.02 | 0.02 | >50 | >50 |
| p-Chlorophenol | 3.9 | 4.0 | 0.02 | 0.01 | >50 | >50 |
| 2,4-dichlorophenol | 13.3 | 12.7 | 0.007 | 0.01 | >50 | >50 |
| 2,4,5-trichlorophenol | 5.0 | | 0.001 | 0.002 | 15 | 30 |
| 2,4,6-trichlorophenol | 3 22.6 | 3 25.0 | 0.0056 | 0.012 | 50 | >50 |
| 2,3,4,6-tetrachlorophenol | 1.1 | 8.3 | 0.002 | 0.004 | 20 | 30 |
| Pentachlorophenol | 5.5 | 5.5 | 0.006 | 0.006 | 15 | 15 |
| p-Chloro-m-cresol | 30.5 | 19.5 | 0.02 | 0.02 | 50 | >50 |
| p-Chloro-m-xylenol | 70.9 | 38.7 | | | 15 | >50 |
| p-Nitrophenol | | | | 0.01-0.05 | >50 | >50 |

1 Not recognized as bactericide. Actual phenol coefficients not determined.
2 Recognized as fair bactercide. Actual phenol coefficients not determined.
3 Phenol coefficients of 2,4,6-trichlorophenol obtained by use of free phenol in alcohol solution.
T. I. P. signifies tonal inhibition point in case of silver nitrate.

From the table it will be evident that no relation exists between bactericidal, fungicidal and algicidal merits of the particular compounds. Thus, copper sulfate, which is a good algicide, is not recognized as an effective bactericide nor is it a particularly effective fungicide. Furthermore, sodium 2,4-dichlorophenate, which is a good bactericide and fungicide, has no outstanding algicidal action whereas sodium pentachlorophenate, a material having a phenol coefficient less than one-half that of sodium 2,4-dichlorophenate, is a better fungicide and a far superior algicide. Chloramine-T, a very good bactericide and a chlorine-liberating compound, contrary to expectations, is a very poor algicide. The sodium salts of the two isomeric trichlorophenols are outstandingly different in this respect; the 2,4,5 isomer is a much better algicide than the 2,4,6 isomer and a much better fungicide but a poorer bactericide according to available published data; although the phenol coefficients are those of sodium 2,4,5-trichlorophenate and 2,4,6-trichlorophenol dissolved in alcohol a free phenol generally has approximately the same phenol coefficient as its sodium salt. All these results are significant, especially since the tests used for determining the algicidal activity are most severe and more nearly simulate actual industrial conditions. Generally when algae are encountered the infestation is not caused by merely one algal organism but by organisms of several unrelated genera.

It was observed further that the specified polychlorophenols are especially toxic to protozoa, considerably more toxic to these organisms than algicides at present in use for the control of slime in water sprays, for example, copper sulfate. This is revealed in comparative tests, tabulated below, wherein the compounds are graded on the basis of their general overall activity toward algae and protozoa. The values represent parts per million of the particular substances which must be added to water to kill the from a power plant. Killing was observed microscopically.

| Substance | Algae | Protozoa |
|---|---|---|
| Sodium pentachlorophenate | 10-100 | 1-3 |
| Sodium 2, 3, 4, 6-tetrachlorophenate | 10-100 | 10 |
| Copper sulfate | 5-10 | 100 |
| Ferric sulfate | 5-100 | 5-100 |
| Sodium o-phenylphenate | 100 | 10-100 |
| Sodium o-vanillin | 100 | 10-100 |
| Chloramine-T | 100 | 100 |

The superiority of the polychlorophenols specified in this application is further emphasized in a somewhat different manner in which the polychlorophenols were tested against a mixed culture consisting of Palmellococcus, Ulothrix, Spirogyra and Scenodesmus, obtained from a spray pond. This culture was grown in Uspenski's medium. The results which follow represent parts per million of the agent which must be added to the medium to prevent growth for the indicated time.

| Substance | 10 days | 20 days |
|---|---|---|
| Sodium pentachlorophenate | 10 | 10 |
| Sodium 2, 3, 4, 6-tetrachlorophenate | 10 | 25 |
| Copper sulfate | 25 | 25 |
| Ferric sulfate | 50 | 50 |
| Sodium o-phenylphenate | 50 | 50 |
| Chloramine-T | 50 | 100 |

Copper, iron and mercury salts when used as algicides exhibit a corrosive action toward metals with which they come into contact in such systems. Chlorine and chlorine-liberating compounds are also corrosive to metals. Phenol and cresols are too fugitive for the present purposes, that is, they are carried off with the vapors escaping in cooling systems exposed to the air and are notably inferior in toxic action toward algae. When used in air-conditioning systems, phenol and cresols, as well as chlorine and chloramine-T, impart odors to air circulated through such systems. The polychlorophenolic algicides of the present invention do not have any substantial corrosive action on metals and are substantially non-volatile under the conditions encountered, as a result of which they possess decided advantages over heretofore used algicides.

In applying the discovery of the effectiveness of water-soluble salts of 2,4,5-trichlorophenol, 2,3,4,6-tetrachlorophenol and pentachlorophenol to the control of slime and algae in water-spray and cooling installations in power plants and humidifying systems in air-conditioning units, the substance is added to water in the proportions indicated by the above results. Generally 5 to 30 pp. or more of sodium pentachlorophenate, for example, is ample and this level is maintained in the system. The system is then operated as usual. The proportions indicated in the above results are those derived from a particular power plant, hence slight changes in the proportions may be desirable should conditions or the organisms themselves be somewhat different. The polychlorophenols for use in this invention are substantially non-corrosive toward all usual metals of construction hence no changes or substitution of metals by less corrodible materials is usually necessitated.

In cases where the free polychlorophenol is used, it may be desirable to add a small amount of alkali such as sodium hydroxide to the phenol to form the sodium salt and thereby to effect more rapid solution of the phenol in the water. Inasmuch as the phenols themselves are completely soluble in water at the great dilutions at which they are used in the practice of the invention, they can be added in solid form to the water reservoir or tank. However, they are easier to dispense and uniform distribution is more rapidly achieved when the phenols are added in the form of a solution. The use of a water-soluble salt or the addition of alkali to the free phenol is usually necessary for the preparation of concentrated solutions, but in preparing such solutions of the phenol it is desirable to add substantially no more alkali than is necessary to produce a stable clear solution since it has been observed that with some algae, alkali stimulates rather than represses the growth. Another convenient method of adding the algicide to the system is to place briquettes or tablets of the salt, such as sodium pentachlorophenate, into a cloth bag at a point in the system past which the water of the system must flow. In this manner small increments will be continually added to the water to replace that portion lost, the distribution of the algicide will be more uniform, and the amount added can be readily controlled.

In applying the invention to a system contaminated with algae in which algal growth had not theretofore been controlled, it is generally desirable to establish an initial concentration of 30 ppm. of sodium pentachlorophenate, for example, to kill all algae, then to reduce this concentration gradually until algae growth just reappears in the system and then to add 5 ppm. more and thereafter maintain the concentration at the level thus established to keep the system free from algal growth.

The concentrations which should be maintained when the type of algal contamination has been ascertained can be estimated from the following table wherein the values represent parts per million of sodium pentachlorophenate required to kill cultures of algae of representative genera growing in Uspenski's medium.

| Genera | Concentration of sodium pentachlorophenate required to kill |
|---|---|
| | Parts per million |
| Palmellococcus | 15 |
| Ulothrix | 5 |
| Spirogyra (6 species) | 5 |
| Scenedesmus (3 species) | 5–15 |
| Chlorella | 15 |
| Oscillatoria | 15 |
| Synura | 5 |
| Aphanizomenon | 15 |
| Rivularia | 20 |
| Ankistrodesmus | 20 |
| Phormidium | 20 |
| Pleurocapsa | 15 |
| Coelastrum | 5 |
| Chlorospaera | 10–15 |
| Pleurococcus | 10 |
| Anabaena | 10 |
| Sumploca | 15 |
| Synedra | 5 |
| Coelosphaerium | 10 |
| Chroococcus | 10 |
| Navicula | 5 |
| Melosira | 5 |
| Tabellaria | 5 |
| Cymbella | 5 |
| Amphora | 10 |

The polychlorophenols which are particularly indicated for use as algicides according to the present invention are 2,4,5-trichlorophenol, 2,3,4,6-tetrachlorophenol and pentachlorophenol and corresponding bromine derivatives and similar halogenated monocyclic phenols having not less than three halogen atoms in the molecule, two halogen atoms of which are in adjacent positions on the benzene nucleus, as well as their metal salts that are soluble to the extent required to produce algicidal effect, for example, salts of calcium, magnesium, barium, zinc, copper, and particularly those of the alkali metals such as sodium and potassium. 2,4,6-trichlorophenol, its salts and corresponding halogen derivatives, which are of inferior algicidal effectiveness, are specifically excluded.

Inasmuch as the above specification comprises preferred embodiments of the invention it is to be understood that the invention is not limited thereto and that variations and changes may be made therein without departing substantially from the spirit of the invention or its scope which is defined in the appended claims.

We claim:

1. An algicide comprising a water-soluble form of a halogenated monocyclic phenol having not less than three halogen atoms in the molecule, two halogen atoms of which are in adjacent positions on the benzene nucleus, which algicide is adapted for the control of algae, protozoa and slime growth.

2. An algicide comprising a compound selected from the group consisting of 2,4,5-trichlorophenol, 2,3,4,6-tetrachlorophenol, pentachlorophenol and their water-soluble salts, which algicide is adapted for the control of algae, protozoa and slime growth.

3. An algicide comprising an alkali-metal salt of a trichlorophenol in which two of the chlorine atoms of the molecule are in adjacent positions on the benzene nucleus, which algicide is adapted for the control of algae, protozoa and slime growth.

4. An algicide comprising an alkali-metal salt of a tetrachlorophenol, which algicide is adapted for the control of algae, protozoa and slime growth.

5. An algicide comprising an alkali-metal salt of pentachlorophenol, which algicide is adapted for the control of algae, protozoa and slime growth.

6. An algicide comprising sodium 2,4,5-trichlorophenate, which algicide is adapted for the control of algae, protozoa and slime growth.

7. An algicide comprising sodium 2,3,4,6-tetrachlorophenate, which algicide is adapted for the control of algae, protozoa and slime growth.

8. An algicide comprising sodium pentachlorophenate, which algicide is adapted for the control of algae, protozoa and slime growth.

9. The method of preventing the deposition and growth of slime-forming organisms in flowing water systems which comprises adding to such flowing water a water-soluble form of a halogenated monocyclic phenol having not less than three halogen atoms in the molecule, two halogen atoms of which are in adjacent positions on the benzene nucleus.

10. The method of preventing the deposition and growth of slime-forming organisms in flowing water systems, which comprises adding to such flowing water a compound selected from the group consisting of 2,4,5-trichlorophenol, 2,3,4,6-tetrachlorophenol, pentachlorophenol and their water-soluble salts.

11. The method of preventng the deposition and growth of slime-forming organisms in flowing water systems which comprises adding to such flowing water sodium pentachlorophenate.

12. A circulating aqueous medium normally tending to develop algae, protozoa and slime growth which deposit on the confining parts of the circulatory system, said medium having added thereto a water-soluble form of a halogenated, monocyclic phenol having not less than three halogen atoms in the molecule, two halogen atoms of which are in adjacent positions on the benzene nucleus.

13. A circulating aqueous medium normally tending to develop algae, protozoa and slime growths which deposit on the confining parts of the circulatory system, said medium having added thereto a compound selected from the group consisting of 2,4,5-trichlorophenol, 2,3,4,6-tetrachlorophenol, pentachlorophenol and their water-soluble salts.

14. A circulating aqueous medium normally tending to develop algae, protozoa and slime growths which deposit on the confining parts of the circulatory system, said medium having added thereto sodium pentachlorophenate.

15. In a flowing water system, the improvement whereby the deposition of algae, protozoa and slime growths is prevented, characterized in that to the water in said system is added a water-soluble form of a halogenated monocyclic phenol having not less than three halogen atoms in the molecule, two halogen atoms of which are in adjacent positions on the benzene nucleus.

16. In a flowing water system, the improvement whereby the deposition of algae, protozoa and slime growths is prevented, characterized in that to the water in said system is added a compound selected from the group consisting of 2,4,5-trichlorophenol, 2,3,4,6-tetrachlorophenol, pentachlorophenol and their water-soluble salts.

17. In a flowing water system, the improvement whereby the deposition of algae, protozoa and slime growths is prevented, characterized in that to the water in said system is added sodium pentachlorophenate.

THOMAS S. CARSWELL.
HOWARD K. NASON.